United States Patent
Sim et al.

(10) Patent No.: US 9,655,081 B2
(45) Date of Patent: May 16, 2017

(54) APPARATUS AND METHOD FOR RANGING FOR UPLINK RESOURCE ALLOCATION IN BROADBAND WIRELESS COMMUNICATION SYSTEM

(75) Inventors: Jae-Jeong Sim, Seongnam-si (KR); Yeong-Moon Son, Yongin-si (KR); Jae-Hyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 13/114,334

(22) Filed: May 24, 2011

(65) Prior Publication Data
US 2011/0292892 A1 Dec. 1, 2011

(30) Foreign Application Priority Data
May 26, 2010 (KR) .................. 10-2010-0049112

(51) Int. Cl.
*H04W 4/00* (2009.01)
*H04W 72/04* (2009.01)
*H04L 5/00* (2006.01)

(52) U.S. Cl.
CPC ....... *H04W 72/0406* (2013.01); *H04L 5/0007* (2013.01); *H04W 72/044* (2013.01)

(58) Field of Classification Search
USPC .............. 370/310, 328–331, 342, 349, 350; 455/422.1, 435, 436, 437, 438
See application file for complete search history.

(56) References Cited

U.S. PATENT DOCUMENTS

| | | | |
|---|---|---|---|
| 6,757,273 B1* | 6/2004 | Hsu et al. ..................... 370/349 |
| 2006/0203712 A1* | 9/2006 | Lim et al. ..................... 370/208 |
| 2006/0209734 A1* | 9/2006 | Son et al. ..................... 370/312 |
| 2006/0239241 A1* | 10/2006 | Eom et al. .................... 370/348 |
| 2007/0104177 A1* | 5/2007 | Hwang et al. ................ 370/348 |
| 2007/0191009 A1* | 8/2007 | Hong ................... H04W 36/26 455/436 |
| 2008/0219222 A1* | 9/2008 | Lo et al. ....................... 370/337 |
| 2010/0041399 A1* | 2/2010 | Kim et al. .................... 455/434 |
| 2010/0124899 A1* | 5/2010 | Shi et al. ................... 455/404.1 |
| 2010/0303022 A1* | 12/2010 | Maas et al. ................... 370/329 |
| 2012/0082101 A1* | 4/2012 | Gaal et al. .................... 370/329 |

* cited by examiner

*Primary Examiner* — Zewdu A Beyen
(74) *Attorney, Agent, or Firm* — Jefferson IP Law, LLP (57) ABSTRACT

An apparatus and method for ranging for uplink resource allocation in a broadband wireless communication system are provided. The method includes detecting, from an Uplink Channel Descriptor (UCD), first ranging codes corresponding to a first region and second ranging codes corresponding to a second region, selecting one of the second ranging codes corresponding to the second region, mapping the selected second ranging code to the first region and transmitting the same to a base station, and receiving an allocation of an uplink resource from the base station.

24 Claims, 8 Drawing Sheets

APPARATUS AND METHOD FOR RANGING FOR UPLINK RESOURCE ALLOCATION IN BROADBAND WIRELESS COMMUNICATION SYSTEM

PRIORITY

This application claims the benefit under 35 U.S.C. §119 of a Korean patent application filed in the Korean Intellectual Property Office on May 26, 2010 and assigned Serial No. 10-2010-0049112, the entire disclosure of which is hereby incorporated by reference.

BACKGROUND OF THE INVENTION

1. Field of the Invention

The present invention relates to a broadband wireless communication system. More particularly, the present invention relates to an apparatus and method for ranging for UpLink (UL) resource allocation in an Orthogonal Frequency Division Multiple Access (OFDMA) system.

2. Description of the Related Art

A wireless access scheme of an Orthogonal Frequency Division Multiple Access (OFDMA) broadband wireless communication system is being standardized by the Institute of Electrical and Electronics Engineers (IEEE) 802.16/16e standardization group.

The broadband wireless communication system performs a ranging process in order to set accurate time/frequency offsets between a Base Station (BS) and a Mobile Station (MS) and to correct a Transmit (TX) power of a mobile station. The ranging process may be classified into initial ranging, handover ranging, periodic ranging, and bandwidth request ranging according to a purpose of the ranging.

The broadband wireless communication system classifies Code Division Multiple Access (CDMA) ranging codes according a purpose of the ranging by the mobile station as illustrated in Table 1 below.

Table 1 illustrates ranging codes used in the IEEE 802.16 system.

TABLE 1

| Name | Type(1 byte) | Length | Value |
| --- | --- | --- | --- |
| Start of ranging codes group | 155 | 1 | Indicates the starting number, S, of the group of codes used for this UpLink (UL). If not specified, the default value shall be set to zero. All the ranging codes used on this UL shall be between S and ((S + O + N + M + L) mod 256) where<br>N is the number of initial ranging codes<br>M is the number of periodic ranging codes<br>L is the number of bandwidth request ranging codes<br>O is the number of handover ranging codes<br>The range of values is $0 \leq S \leq 255$. |
| Handover Ranging Codes | 194 | 1 | Number of handover ranging CDMA codes. Possible values are 0-255. |
| Initial ranging codes | 150 | 1 | Number of initial ranging CDMA codes. Possible values are 0-255. |
| Periodic ranging codes | 151 | 1 | Number of periodic ranging CDMA codes. Possible values are 0-255. |
| Bandwidth request codes | 152 | 1 | Number of bandwidth request ranging codes. Possible values are 0-255. |

As illustrated in Table 1, the broadband wireless communication system classifies CDMA codes into an initial ranging code, a handover ranging code, a periodic ranging code, and a bandwidth request code according to a purpose of the ranging.

Accordingly, in order to perform ranging, the mobile station selects a code corresponding to a purpose of the ranging, among the CDMA codes negotiated with the base station, and transmits the selected code to the base station through a ranging region of an uplink subframe.

Figure 1:
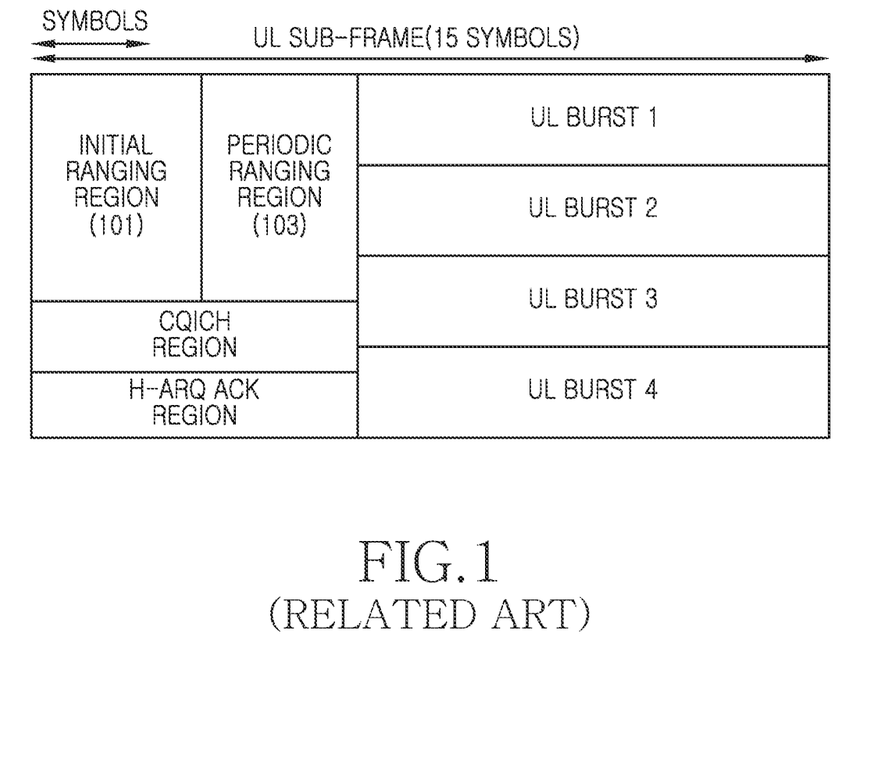
FIG. 1 is a diagram illustrating a general uplink subframe according to the related art.

FIG. 1 is a diagram illustrating a general uplink subframe according to the related art.

Referring to FIG. 1, the uplink subframe is allocated a ranging region for transmitting a ranging code of the mobile station. The ranging region includes an initial ranging region 101 for transmitting the initial ranging code or the handover ranging code and a periodic ranging region 103 for transmitting the periodic ranging code or the bandwidth request code.

In a broadband wireless communication system of the related art, when a mobile station uses an initial ranging region 101 to transmit an initial ranging code or a handover ranging code to a base station, the base station allocates the mobile station a predefined amount of bandwidth through a CDMA Allocation Information Element (CDMA_Allocation_IE). That is, the base station allocates an uplink resource in consideration the maximum size of a RaNGing REQuest (RNG-REQ) message because the base station does not know how much data a CDMA code received from the mobile station will utilize. The bandwidth allocated to the mobile station by the base station is about 60 bytes corresponding to two or more subchannels. That is, the broadband wireless communication system of the related art uses an uplink resource of more than two subchannels in order to perform uplink transmission of the mobile station in a ranging process, thus degrading a base station cell-boundary reception rate and limiting the base station coverage area.

Thus, an uplink resource of less than one subchannel is allocated in a ranging process in the broadband wireless communication system of the related art. However, in the broadband wireless communication system of the related art, the mobile station and the base station are difficult to change because they are implemented on the basis of the IEEE 802.16/16e standards. Also, because the number of CDMA codes available to the base station is limited, it is difficult to add a new code group. Also, the addition of a new code group reduces the number of CDMA codes within the code group, thus increasing the probability of a collision between the CDMA codes.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide an apparatus and method for ranging for uplink resource allocation in a broadband wireless communication system.

Another object of the present invention is to provide an apparatus and method for ranging in a broadband wireless communication system, which limits the bandwidth of an uplink resource, allocated by a base station, by reusing Code Division Multiple Access (CDMA) codes without defining new CDMA codes.

Another object of the present invention is to provide an apparatus and method for ranging in a broadband wireless communication system, in which a mobile station transmits a periodic ranging code or a bandwidth request code through an initial ranging region to request the allocation of an uplink resource.

Another object of the present invention is to provide an apparatus and method for ranging in a broadband wireless communication system, in which a mobile station transmits a periodic ranging code or a bandwidth request code through an initial ranging region to request the allocation of an uplink resource of less than one subchannel.

Another object of the present invention is to provide an apparatus and method for ranging in a broadband wireless communication system, in which a mobile station transmits a bandwidth request code or a periodic ranging code, negotiated with a base station, through an initial ranging region to request the allocation of an uplink resource of a desired size.

According to an aspect of the present invention, a method for ranging of a mobile station for uplink resource allocation in a broadband wireless communication system is provided. The method includes detecting, from an Uplink Channel Descriptor (UCD), first ranging codes corresponding to a first region and second ranging codes corresponding to a second region, selecting one of the second ranging codes corresponding to the second region, mapping the selected second ranging code to the first region and transmitting the same to a base station, and receiving an allocation of an uplink resource from the base station.

According to another aspect of the present invention, a method of a base station for uplink resource allocation in a broadband wireless communication system is provided. The method includes broadcasting a UCD indicating first ranging codes corresponding to a first region and second ranging codes corresponding to a second region, receiving one of the second ranging codes from a mobile station through the first region, and limiting an uplink resource allocated to the mobile station according to a predefined scheme.

According to another aspect of the present invention, an apparatus for ranging of a mobile station for uplink resource allocation in a broadband wireless communication system is provided. The apparatus includes a controller for detecting, from a UCD, first ranging codes corresponding to a first region and second ranging codes corresponding to a second region, for selecting one of the second ranging codes corresponding to the second region, and for mapping the selected second ranging code to the first region, a transmitter for transmitting the selected ranging code to a base station through the first region, and a receiver for receiving an allocation of an uplink resource from the base station.

According to another aspect of the present invention, an apparatus of a base station for uplink resource allocation in a broadband wireless communication system is provided. The apparatus includes a transmitter for broadcasting a UCD indicating first ranging codes corresponding to a first region and second ranging codes corresponding to a second region, a receiver for receiving one of the second ranging codes from a mobile station through the first region, and a controller for limiting an uplink resource allocated to the mobile station according to a predefined scheme.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide Exemplary embodiments of the present invention provide a scheme for ranging in a broadband wireless communication system, which limits the bandwidth of an uplink resource, allocated by a base station, by reusing Code Division Multiple Access (CDMA) codes without defining new CDMA codes.

Figure 2:
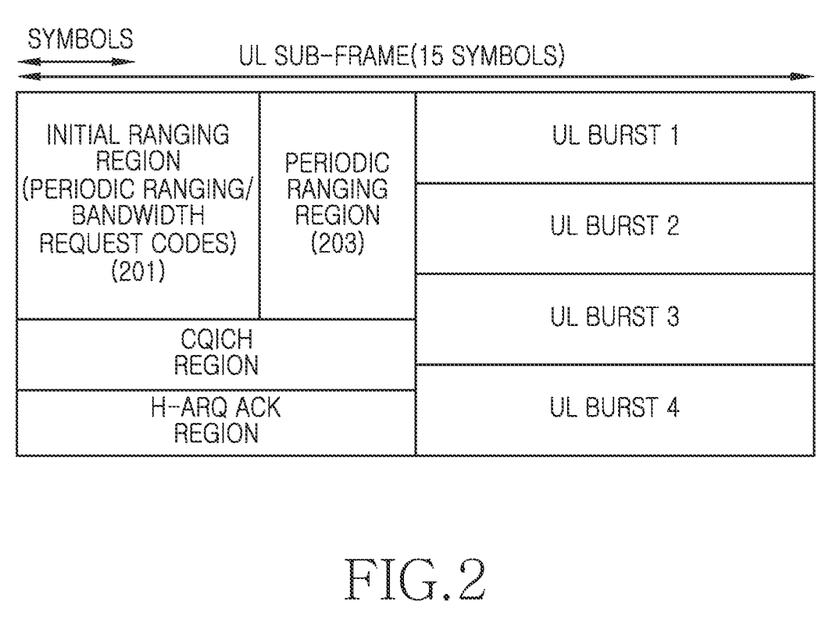
FIG. 2 is a diagram illustrating an uplink subframe according to an exemplary embodiment of the present invention.

FIG. 2 is a diagram illustrating an uplink subframe according to an exemplary embodiment of the present invention.

As described above, the broadband wireless communication system of the related art classifies CDMA codes into an initial ranging code, a handover ranging code, a periodic ranging code, and a bandwidth request code according to the purpose of the ranging. Also, the broadband wireless communication system of the related art transmits the initial ranging code and the handover ranging code through an initial ranging region 201 and transmits the periodic ranging code and the bandwidth request code through a periodic ranging region 203.

That is, according to the broadband wireless communication system of the related art, the periodic ranging code or the bandwidth request code cannot be transmitted in the initial ranging region 201. This is to secure a high reception rate of a CDMA code in a limited initial ranging region and to stabilize an initial ranging operation and a handover ranging operation that are more important than a periodic ranging operation and a bandwidth request ranging operation. However, it is prescribed that the initial ranging code and the handover ranging code are transmitted in the initial ranging region 201 only one time. Therefore, the initial ranging region 201 is less frequently used than the periodic ranging region 203.

Thus, as illustrated in FIG. 2, according to an exemplary embodiment of the present invention, a periodic ranging code and a bandwidth request code may be transmitted in an initial ranging region 201, and the bandwidth of an uplink resource allocated to a mobile station by a base station may be limited. For example, the base station limits the bandwidth of the uplink resource allocated to the mobile station to less than one subchannel or to the bandwidth corresponding to the size requested by the mobile station.

With reference to FIGS. 3 to 6, a description will be given of a case where a mobile station transmits a periodic ranging code or a bandwidth request code through an initial ranging region 201 and a base station limits the bandwidth of an uplink resource allocated to the mobile station to less than one subchannel. Although the following description is made in the context of bandwidth request ranging and initial ranging of the mobile station, the present exemplary embodiment may also be applicable to any case where the mobile station requires uplink resource allocation.

Figure 3:
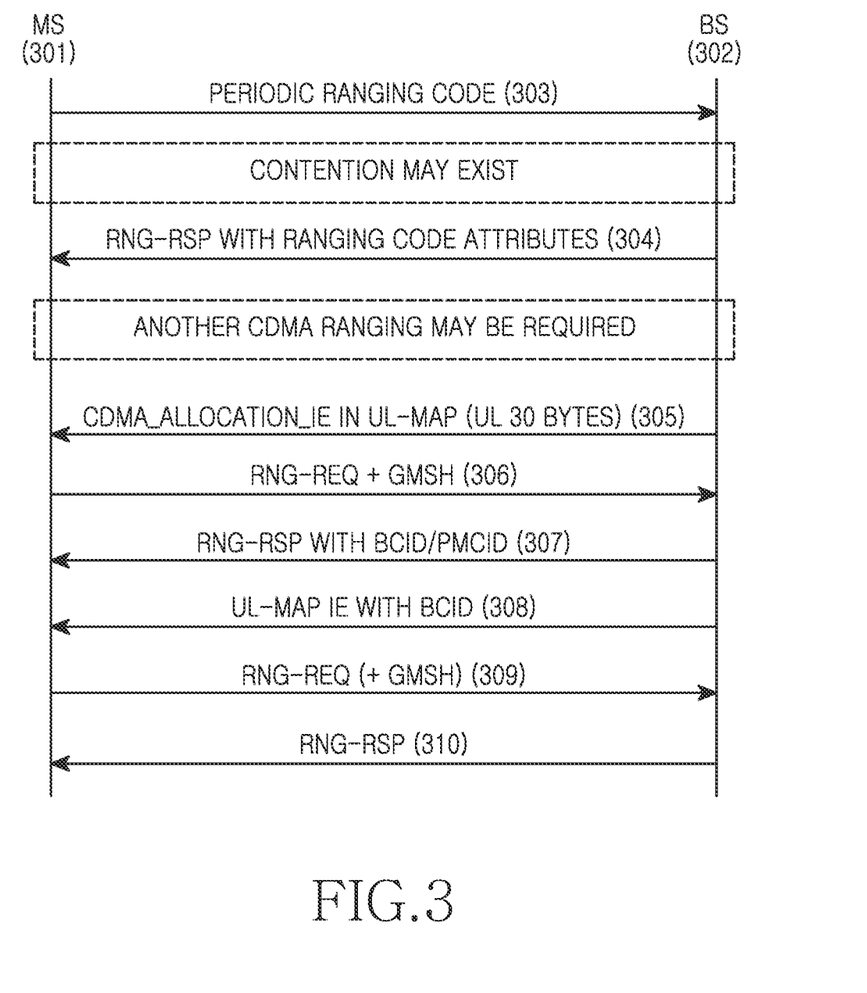
FIG. 3 is a diagram illustrating an initial ranging process in a broadband wireless communication system according to an exemplary embodiment of the present invention.

FIG. 3 is a diagram illustrating an initial ranging process in a broadband wireless communication system according to an exemplary embodiment of the present invention.

Referring to FIG. 3, in step 303, a Mobile Station (MS) 301 selects a periodic ranging code instead of an initial ranging code for initial network access or re-access and transmits the periodic ranging code to a Base Station (BS) 302 through the initial ranging region 201. Herein, the mobile station 301 may transmit a bandwidth request code instead of the periodic ranging code. The mobile station 301 may obtain information about an initial ranging code, a handover ranging code, a periodic ranging code, and a bandwidth request code from an Uplink Channel Descriptor (UCD) message broadcasted from the base station 302.

Upon receiving the periodic ranging code through the initial ranging region 201, the base station 302 detects the need to limit the uplink resource allocation of the mobile station and transmits a RaNGing ReSPonse (RNG-RSP) message, which includes information for correcting Transmit (TX) power, frequency and time of the mobile station 301, to the mobile station 301 in step 304. The ranging response message includes ranging code attributes that include information about the periodic ranging code received from the mobile station 301.

In step 305, the base station 302 allocates the mobile station a bandwidth of less than one subchannel through a CDMA Allocation Information Element (CDMA_Allocation_IE). Herein, the base station 302 may limit the bandwidth allocated to the mobile station in consideration of a downlink/uplink ratio of the system. For example, if the downlink/uplink ratio is 35:12, the bandwidth allocated to the mobile station may be limited to less than 18 bytes corresponding to 3 slots. If the downlink/uplink ratio is 35:15, the bandwidth allocated to the mobile station may be limited to less than 24 bytes corresponding to 4 slots. If the downlink/uplink ratio is 29:18, the bandwidth allocated to the mobile station may be limited to less than 30 bytes corresponding to 5 slots. That is, the bandwidth allocated to the mobile station 301 by the base station 302 becomes up to 18 bytes, 24 bytes, or 30 bytes according to the downlink/uplink ratio.

In step 306, the mobile station 301 fragments a RaNGing REQuest (RNG-REQ) message according to the allocated uplink resource and transmits the fragmented first message to the base station 302. Herein, the mobile station 301 may piggyback a Grant Management Sub-Header (GMSH) on the fragmented first message to request the base station to allocate an additional uplink resource. Also, the fragmented first message may include one or more of a Cyclic Redundancy Check (CRC), a Media Access Control (MAC) version value, a MAC address of the mobile station, etc. If the amount of an uplink resource allocated to the mobile station 301 is sufficient to transmit the ranging request message at a time, the mobile station 301 does not fragment the ranging request message and does not request the base station 302 to allocate an additional uplink resource.

In step 307, the base station 302 transmits a ranging response message including a Basic Connection IDentifier (BCID) and a Primary Management Connection IDentifier (PMCID) to the mobile station 301. In step 308, the base station 302 allocates an additional uplink resource requested by the mobile station.

In step 309, the mobile station 301 transmits the remaining fragmented messages through the additional uplink resource. In step 310, the base station 302 transmits a ranging response message to the mobile station 301 to complete the ranging process. Herein, if the mobile station 301 cannot transmit the remaining fragmented messages through the additional uplink resource, it requests the allocation of an additional uplink resource by piggybacking a GMSH on the fragmented message transmitted to the base station 302, so that the base station 302 repeats the additional uplink resource allocation process.

Figure 4:
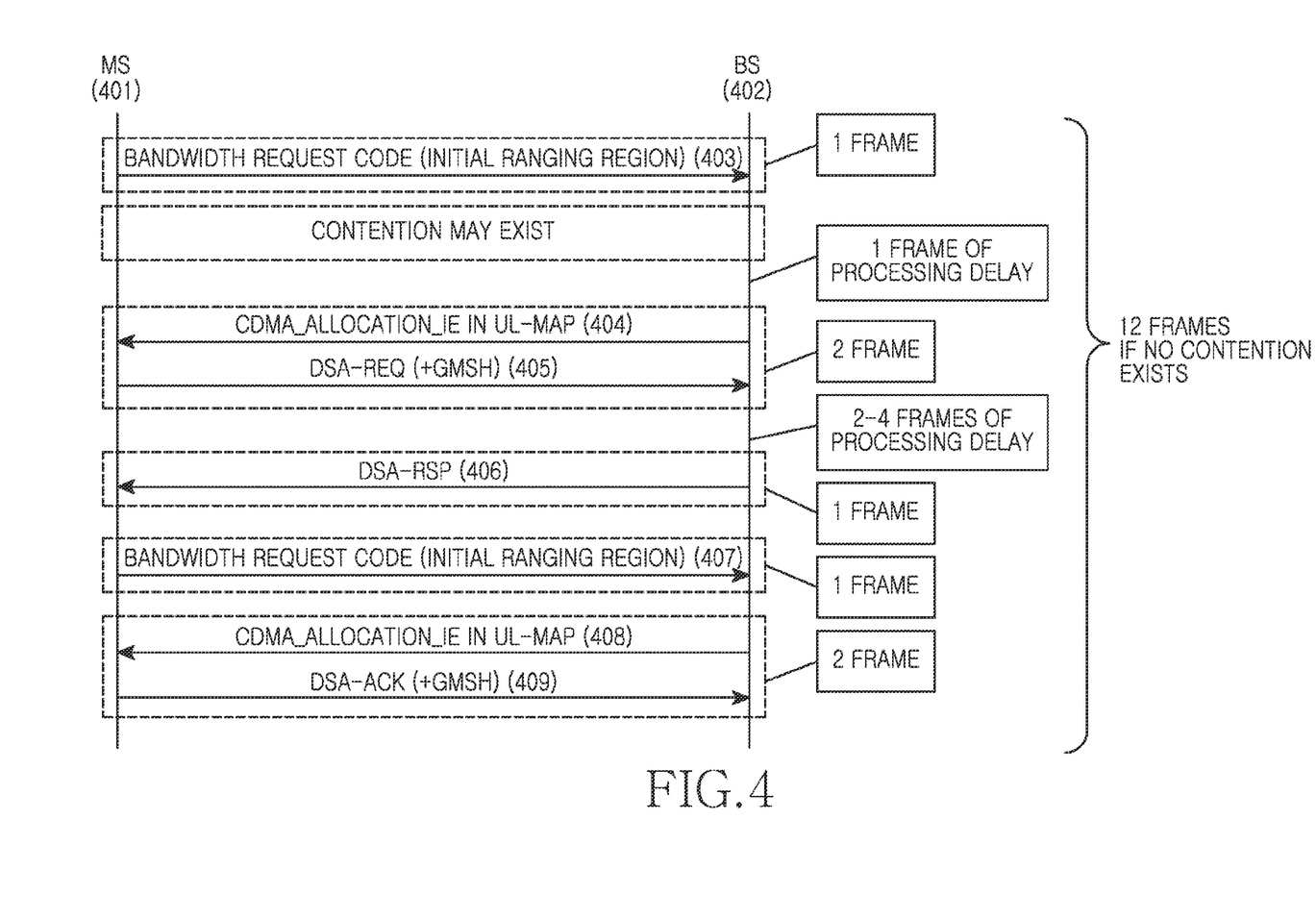
FIG. 4 is a diagram illustrating a bandwidth request ranging process in a broadband wireless communication system according to an exemplary embodiment of the present invention.

FIG. 4 is a diagram illustrating a bandwidth request ranging process in a broadband wireless communication system according to an exemplary embodiment of the present invention. Although the following description is made of an exemplary case where a bandwidth request ranging process is performed to transmit/receive a Dynamic Service Addition (DSA) message, the present exemplary embodiment may also be applicable to any case where the bandwidth request ranging process is required.

Referring to FIG. 4, in step 403, a mobile station 401 selects a bandwidth request code and transmits the bandwidth request code to a base station 402 through the initial ranging region 201 instead of the periodic ranging region 203. Herein, the mobile station 401 may obtain information about an initial ranging code, a handover ranging code, a periodic ranging code, and a bandwidth request code from a UCD message broadcasted from the base station 402.

Upon receiving the bandwidth request code through the initial ranging region 201, the base station 402 detects whether the uplink resource allocation of the mobile station 401 should be limited and allocates the mobile station a bandwidth of less than one subchannel through a CDMA_Allocation_IE, in step 404. Herein, the base station 402 may limit the bandwidth allocated to the mobile station in consideration of a downlink/uplink ratio of the system. For example, if the downlink/uplink ratio is 35:12, the bandwidth allocated to the mobile station may be limited to less than 18 bytes corresponding to 3 slots. If the downlink/uplink ratio is 35:15, the bandwidth allocated to the mobile station may be limited to less than 24 bytes corresponding to 4 slots. If the downlink/uplink ratio is 29:18, the bandwidth allocated to the mobile station may be limited to less than 30 bytes corresponding to 5 slots. That is, the bandwidth allocated to the mobile station 401 by the base station 402 becomes up to 18 bytes, 24 bytes, or 30 bytes according to the downlink/uplink ratio.

In step 405, the mobile station 401 transmits a DSA REQuest (DSA-REQ) message to the base station 402. If the bandwidth of the uplink resource allocated from the base station 402 is not sufficient to transmit the DSA request message at a time, the mobile station 401 fragments the DSA request message and transmits the fragmented first message to the base station 402. Herein, the mobile station 401 may piggyback a GMSH on the fragmented first message to request the base station 402 to allocate an additional uplink resource.

In step 406, the base station 402 transmits a DSA ReSPonse (DSA-RSP) message to the mobile station 401.

In step 407, in order to transmit a DSA ACKnowledgement (DSA-ACK) message for the dynamic service request, the mobile station 401 transmits a bandwidth request code to the base station 402 through the initial ranging region 201.

The base station 402 detects that the uplink resource allocation of the mobile station 401 should be limited, and allocates the mobile station a bandwidth of less than one subchannel through a CDMA_Allocation_IE in step 408. Herein, the base station 402 may limit the bandwidth allocated to the mobile station in consideration of a downlink/uplink ratio of the system.

In step 409, the mobile station 401 transmits the DSA-ACK message for the dynamic service addition to the base station to complete the ranging process. Herein, if the DSA-ACK message for the dynamic service addition cannot be transmitted through the additional uplink resource, the mobile station 401 fragments the message and requests the base station 402 to allocate an additional uplink resource, through a GMSH piggyback scheme.

Regarding the above DSA message transmission/reception process, although there is a difference between manufacturers of base stations and mobile stations, the DSA message transmission/reception time according to an exemplary embodiment of the present invention is 10 frames to 12 frames, while the DSA message transmission/reception time according to the related art is 17 frames to 21 frames. In the related art, when a mobile station transmits a bandwidth request code to a base station in order to transmit an uplink message, because the base station allocates a 6-byte uplink resource capable of transmitting only a bandwidth request header, the mobile station again requests a bandwidth used to transmit an actual message. However, in an exemplary embodiment of the present invention, when the mobile station transmits a bandwidth request code through the initial ranging region, because the base station allocates an uplink resource of less than one subchannel, the mobile station may transmit an actual message without transmitting a bandwidth request header.

Thus, an exemplary embodiment of the present invention may be used by the mobile station to request an uplink bandwidth for urgent short message data or other applications/operations.

Figure 5:
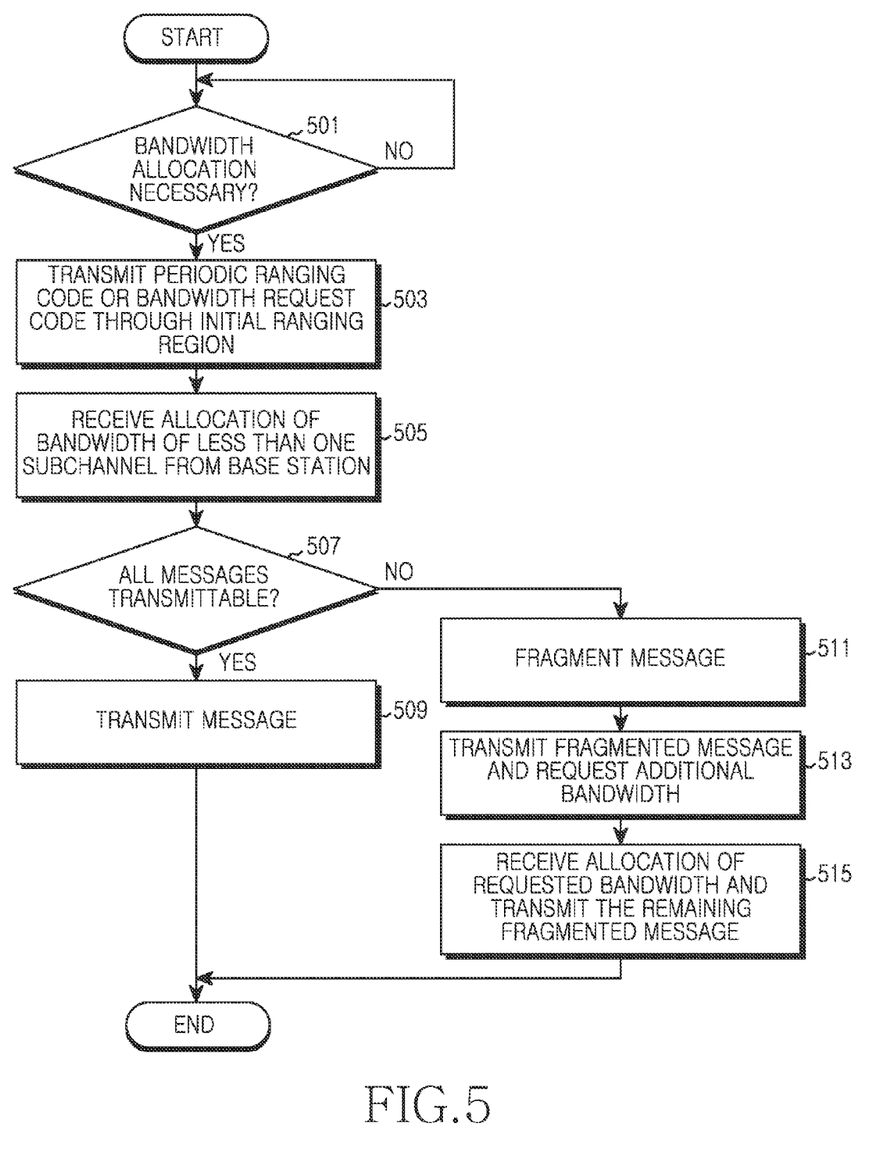
FIG. 5 is a diagram illustrating a process for a mobile station to receive an allocation of an uplink resource by transmitting a periodic ranging code or a bandwidth ranging code in an initial ranging region according to an exemplary embodiment of the present invention.

FIG. 5 is a diagram illustrating a process for a mobile station to receive an allocation of an uplink resource by transmitting a periodic ranging code or a bandwidth ranging code in an initial ranging region according to an exemplary embodiment of the present invention.

Referring to FIG. 5, in step 501, the mobile station determines whether an uplink bandwidth is necessary. For example, the mobile station determines whether an uplink bandwidth is necessary to transmit a ranging request message or a DSA request message to a base station.

If the uplink bandwidth is necessary, the mobile station selects one of bandwidth request codes or periodic ranging codes negotiated with the base station and transmits the selected code to the base station through an initial ranging region, in step 503.

In step 505, the mobile station receives an allocation of a bandwidth of less than one subchannel from the base station. In step 507, the mobile station determines whether all of the TX messages may be transmitted through the allocated bandwidth. That is, the mobile station may compare the size of the allocated bandwidth with the size of the TX message.

If all of the TX messages may be transmitted through the allocated bandwidth, the mobile station transmits the message in step 509 and ends the algorithm according to the present invention.

On the other hand, if all of the TX messages cannot be transmitted through the allocated bandwidth, the mobile station fragments the TX message in step 511 and transmits the fragmented first message to the base station in step 513.

At this point, the mobile station piggybacks a GMSH on the first message to request additional uplink resource allocation.

Thereafter, the mobile station is allocated the additional uplink resource to transmit the remaining fragmented messages in step 515, and ends the algorithm according to an exemplary embodiment of the present invention. Herein, if the remaining fragmented messages cannot be transmitted through the additional uplink resource, the mobile station may repeat steps 513 and 515.

Figure 6:
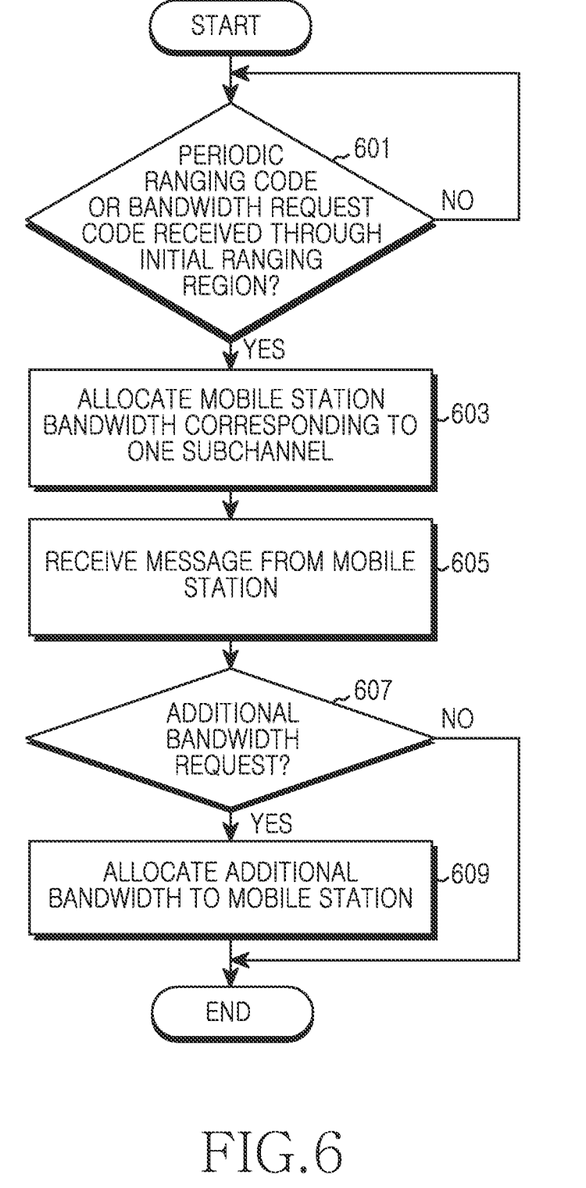
FIG. 6 is a diagram illustrating a process for a base station to allocate an uplink resource by receiving a periodic ranging code or a bandwidth ranging code in an initial ranging region according to an exemplary embodiment of the present invention.

FIG. 6 is a diagram illustrating a process for a base station to allocate an uplink resource by receiving a periodic ranging code or a bandwidth ranging code in an initial ranging region according to an exemplary embodiment of the present invention.

Referring to FIG. 6, in step 601, the base station determines whether a periodic ranging code or a bandwidth request code is received through an initial ranging region.

mobile station when the mobile station selects a bandwidth request code among bandwidth request codes or periodic ranging codes and transmits the selected bandwidth ranging code through the initial ranging region.

With reference to Table 2 below, a description will be given of a case where codes among bandwidth request codes or periodic ranging codes are additionally defined according to an exemplary embodiment of the present invention, the mobile station transmits the additionally-defined code through the initial ranging region, and the base station determines the size of a bandwidth needed by the mobile station through the additionally-defined code and allocates the bandwidth to the mobile station.

Table 2 illustrates a ranging code defined in a broadband wireless communication system according to an exemplary embodiment of the present invention, which may be included in a UCD message.

TABLE 2

| Name | Type (1 byte) | Length | Value |
|---|---|---|---|
| Fast UpLink (UL) Allocation codes group | xxx | Variable (2x NG) | Bits #0~#1 of 2 Most Significant Bits (MSBs): NG, Number of code groups (0b00 = a single group ~0b11 = 4 groups) Bits #2~#5 of 2 MSBs: For 1st group, Number of codes from Bandwidth request code in increasing order (0b0000 = "1"~b1111 = "16") Bits #6~#15 of 2 MSBs: For 1st group, Number of bytes of UL bandwidth requested by the mobile station. The (NG-1) times of 2 bytes follows. Bits #0~#3 of next 2 MSBs: For the next group, Number of codes from Bandwidth request code in increasing order (0b0000 = "1"~b1111 = "16") Bits #4~#15 of next 2 MSBs: For the next group, Number of bytes of UL bandwidth requested by the mobile station. |

If the periodic ranging code or the bandwidth request code is received through the initial ranging region, the base station detects whether the uplink resource allocation of the mobile station should be limited and allocates a bandwidth of less than one subchannel in step 603. Herein, the base station may limit the bandwidth allocated to the mobile station in consideration of a downlink/uplink ratio of the system. For example, if the downlink/uplink ratio is 35:12, the bandwidth allocated to the mobile station may be limited to less than 18 bytes corresponding to 3 slots. If the downlink/uplink ratio is 35:15, the bandwidth allocated to the mobile station may be limited to less than 24 bytes corresponding to 4 slots. If the downlink/uplink ratio is 29:18, the bandwidth allocated to the mobile station may be limited to less than 30 bytes corresponding to 5 slots. That is, the base station may allocate the mobile station an uplink resource of up to 18 bytes, 24 bytes, or 30 bytes according to the downlink/uplink ratio.

In step 605, the base station receives a message from the mobile station. In step 607, the base station determines whether an additional bandwidth allocation request is received from the mobile station. If an additional bandwidth allocation request is received from the mobile station, the base station allocates the mobile station an additional uplink bandwidth in step 609. On the other hand, if an additional bandwidth allocation request is not received from the mobile station, the base station ends the algorithm according to an exemplary embodiment of the present invention.

FIGS. 3 to 6 illustrate the case where the base station limits the bandwidth of the uplink resource allocated to the Referring to Table 2, "Fast UL Allocation codes group" are ranging codes for indicating a bandwidth needed by the mobile station when it is transmitted through the initial ranging region according to an exemplary embodiment of the present invention, which may include codes among bandwidth request codes or periodic ranging codes predefined in an Institute of Electrical and Electronics Engineers (IEEE) 802.16/16e system. Regarding a fast UL allocation code group, the first two bits indicate the number of code groups. The next four bits indicate the number of codes used for the fast UL allocation in each code group. The next ten bits indicate the uplink bandwidth requested by the mobile station.

Herein, if there are two or more code groups, the first two bits in the first code group indicate that there are two or more code groups. The next four bits indicate the number of codes used in the first code group. The next ten bits indicate the uplink bandwidth requested by the mobile station. In the second code group, the first four bits indicate the number of codes used and the next 12 bits indicate the uplink bandwidth needed by the mobile station. This is because there is no need to repeatedly indicate the number of code groups. Herein, each code group may be configured according to the uplink bandwidth size. For example, the first code group may include codes for requesting a 10-byte uplink resource, and the second code group may include codes for requesting a 30-byte uplink resource. In Table 2, the fast UL allocation code group may include up to four code groups and each code group may include 16 codes, to which the present invention is not limited.

As illustrated in Table 2, an exemplary embodiment of the present invention defines some of bandwidth request codes or periodic ranging codes as additional fast UL allocation codes. Each of the fast UL allocation codes indicates the uplink bandwidth requested by the mobile station. The mobile station selects a code for requesting a bandwidth for message transmission among the fast UL allocation codes and transmits the selected code through the initial ranging region. The base station may allocate the bandwidth through the code received from the mobile station. That is, the mobile station transmits the fast UL allocation code through the initial ranging region to receive an allocation of a necessary bandwidth from the base station.

This may reduce the two-step process described with reference to FIGS. 3 to 6 (i.e., the process of transmitting a bandwidth request code or a periodic ranging code from the mobile station through the initial ranging region and then transmitting a separate bandwidth request header for requesting an additional bandwidth) to a one-step process of transmitting a fast UL allocation code.

The fast UL allocation code defined in Table 2 may be used to transmit a message from the mobile station (e.g., an RNG-REQ or a Subscriber station Basic Capability REQuest (SBC-REQ)), to transmit a message from the mobile station for a certain purpose (e.g., an RNG-REQ during handover or an RNG-REQ during initial network entry), or to transmit a data burst for a certain purpose from the mobile station (e.g., an emergency service).

Figure 7:
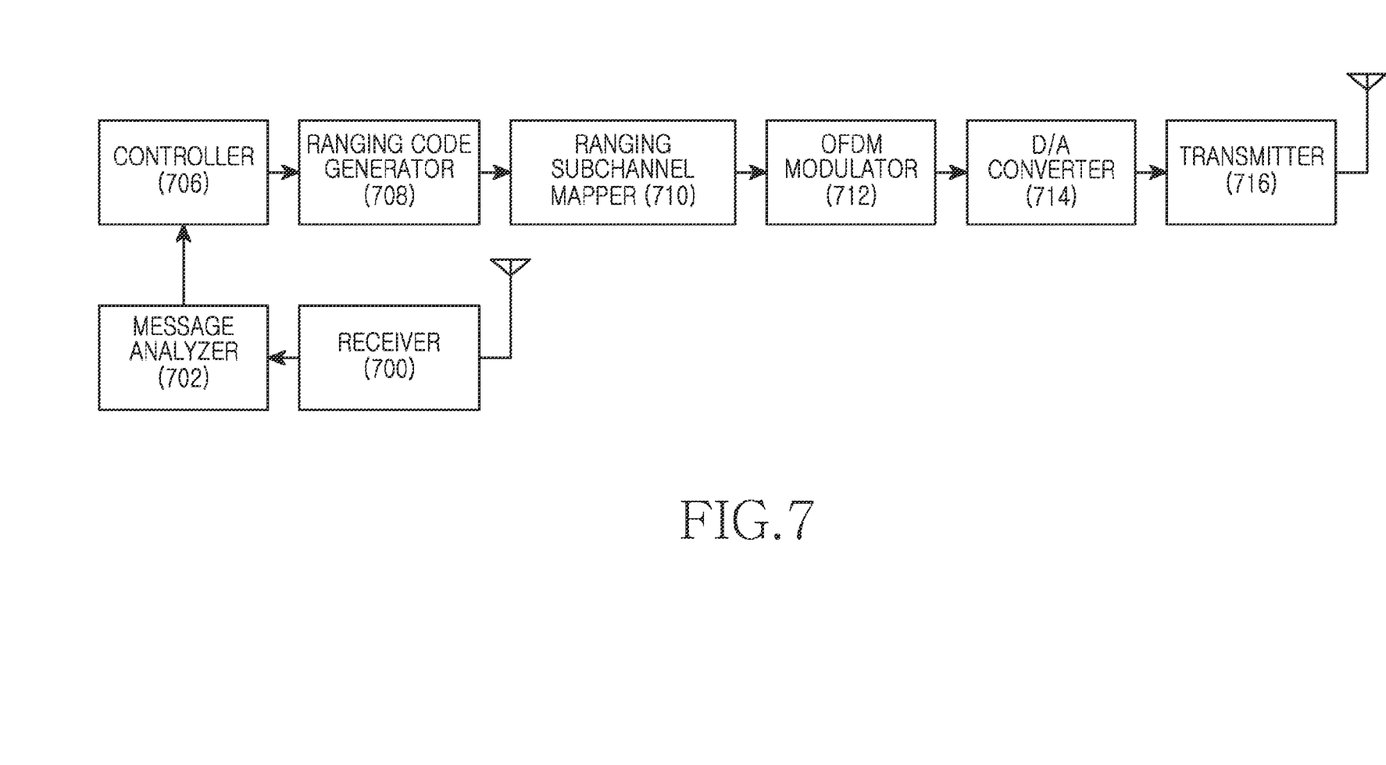
FIG. 7 is a block diagram of a mobile station according to an exemplary embodiment of the present invention.

FIG. 7 is a block diagram of a mobile station according to an exemplary embodiment of the present invention.

Referring to FIG. 7, the mobile station includes a receiver 700, a message analyzer 702, a controller 706, a ranging code generator 708, a ranging subchannel mapper 710, an Orthogonal Frequency-Division Multiplexing (OFDM) modulator 712, a Digital-to-Analog (D/A) converter 714, and a transmitter 716.

The receiver 700 uses a physical layer decoder to physical-layer-decode a signal received through an antenna, and provides the resulting signal to the message analyzer 702. For example, the receiver 700 may include a Radio Frequency (RF) receiving block, a demodulation block, and a channel decoding block.

The message analyzer 702 is a block for decoding a MAC message. The message analyzer 702 analyzes a message received from the receiver 700. The message analyzer 702 analyzes various messages (e.g., a UCD, an RNG-RSP, a DSA_RSP, or a CDMA_Allocation_IE) received from a base station to obtain various data (e.g., a Ranging Code Transmission Region, a Ranging Code, a Time, a Frequency, and a TX power Correction Value), and provides the obtained data to the controller 706.

The controller 706 controls an overall operation of the mobile station. According to an exemplary embodiment of the present invention, when ranging is necessary, the controller 706 orders the ranging code generator 708 to generate a ranging code. More particularly, the controller 706 controls the ranging code generator 708 and the ranging subchannel mapper 710 to transmit a periodic ranging code or a bandwidth request code through an initial ranging region. Herein, the controller 706 detects an initial ranging region 201, a periodic ranging region 203, an initial ranging code, a handover ranging code, a periodic ranging code, and a bandwidth request code from a UCD through the message analyzer 702, and provides the same to the ranging code generator 708. Also, if the bandwidth of an uplink resource allocated from the base station is smaller than the size of a TX message, the controller 706 fragments the TX message, piggybacks an additional bandwidth allocation request header on the fragmented message, and transmits the same to the base station. Also, the controller 706 detects codes redefined for fast uplink allocation from the UCD as illustrated in Table 2, selects a code for requesting the bandwidth corresponding to the TX message of the mobile station from the redefined codes, and maps the same to the first region.

Also, the controller 706 controls the TX power and the time/frequency offset of an uplink signal on the basis of the correction values of a ranging response message received from the base station.

The ranging code generator 708 receives ranging codes from the controller 706 and manages a code group for each ranging type (e.g., initial ranging, handover ranging, periodic ranging, and bandwidth request ranging). The ranging code generator 708 selects a ranging code from the code group for the ranging type, and outputs the selected ranging code to be transmitted in the corresponding region. Under the control of the controller 706, the ranging code generator 708 outputs a periodic ranging code or a bandwidth request code to be transmitted in an initial ranging region.

The ranging subchannel mapper 710 maps the ranging code received from the ranging code generator 708 to a ranging region. For example, in the case of the IEEE 802.16/16e system, a plurality of ranging slots may be present in a ranging region allocated to each frame. Under the control of the controller 706, the ranging subchannel mapper 710 may map a periodic ranging code or a bandwidth request code to an initial ranging region.

The OFDM modulator 712 Inverse Fast Fourier Transform (IFFT)-processes the resource-mapped ranging code received from the ranging subchannel mapper 710, and inserts a guard interval into the resulting sample data to generate an OFDM symbol. The D/A converter 714 converts the baseband sample data received from the OFDM modulator 712 into an analog signal. The Transmitter 716 converts the baseband analog signal received from the D/A converter 714 into a transmittable RF signal, and transmits the RF signal through an antenna.

Figure 8:
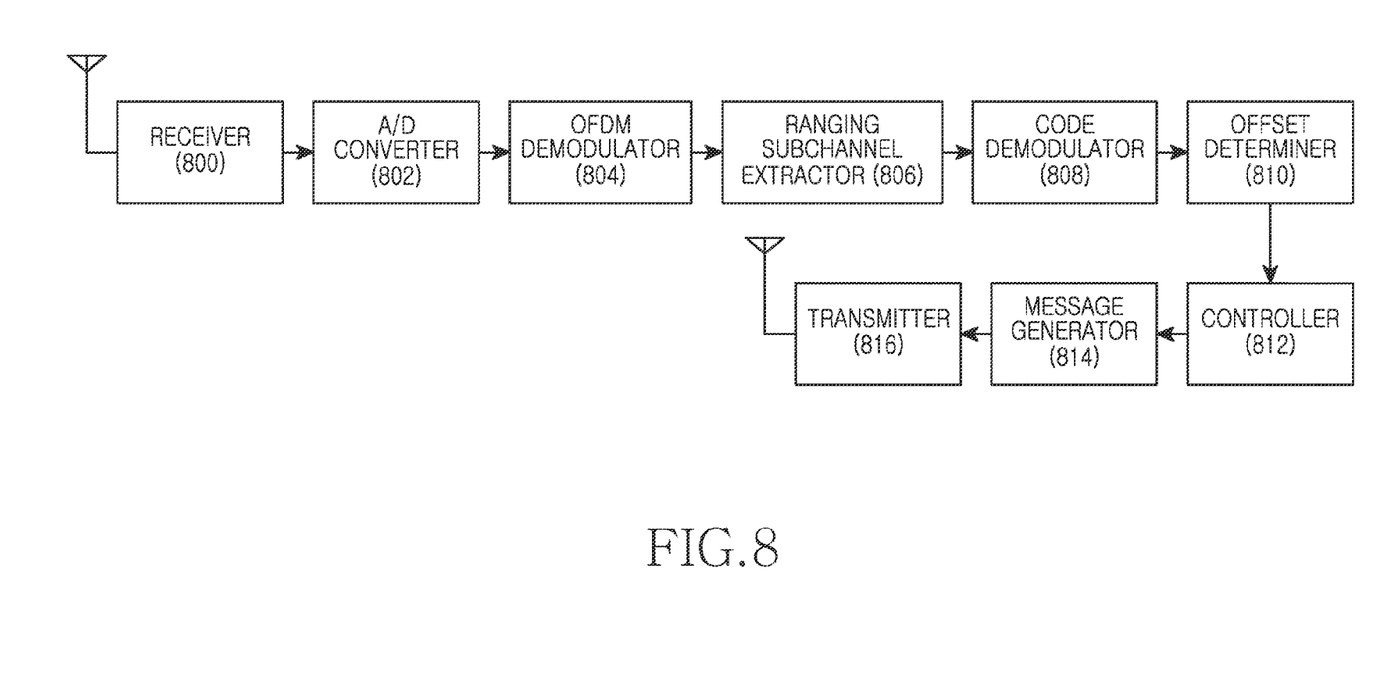
FIG. 8 is a block diagram of a base station according to an exemplary embodiment of the present invention.

FIG. 8 is a block diagram of a base station according to an exemplary embodiment of the present invention.

Referring to FIG. 8, the base station includes a receiver 800, an Analog-to-Digital (A/D) converter 802, an OFDM demodulator 804, a ranging subchannel extractor 806, a code demodulator 808, an offset determiner 810, a controller 812, a message generator 814, and a transmitter 816.

The receiver 800 includes a filter and a frequency converter, and converts an RF signal received through an antenna into a baseband signal. The A/D converter 802 converts the analog baseband signal received from the receiver 800 into a digital signal (i.e., sample data). The OFDM demodulator 804 removes a guard interval from the sample data received from the A/D converter 802, and Fast Fourier Transform (FFT)-processes the resulting signal to output subcarrier values (i.e., frequency-domain data).

The ranging subchannel extractor 806 extracts data mapped with a ranging signal (i.e., a ranging code) from the frequency-domain data received from the OFDM demodulator 804. Herein, if a periodic ranging code or a bandwidth request code is extracted in an initial ranging region, the ranging subchannel extractor 806 transmits the corresponding code to the controller 812.

The code demodulator 808 uses ranging codes and data received from the ranging subchannel extractor 806 to perform code demodulation, and provides the results to the offset determiner 810. The offset determiner 810 uses the results received from the code demodulator 808 to estimate RX power and time/frequency offset, and provides the estimation values to the controller 812.

The controller 812 determines time, frequency and TX power correction values according to the values received from the offset determiner 810, and provides the determined correction values to the message generator 814. Also, the controller 812 receives a signal and a code, which indicates that a periodic ranging code or a bandwidth request code is received through an initial ranging region, from the ranging subchannel extractor 806, and determines the size of an uplink bandwidth to be allocated to a mobile station. That is, the controller 812 may allocate the mobile station an uplink bandwidth less than one subchannel or a bandwidth indicated by the received ranging code. Herein, when receiving a message from the mobile station through an uplink resource, the controller 812 detects an additional bandwidth allocation request header from the message and allocates an additional uplink bandwidth to the mobile station. Also, the controller 812 uses a UCD message to broadcast information about an initial ranging code, a handover ranging code, a periodic ranging code, and a bandwidth request code. Also, the controller 812 redefines a periodic ranging code or a bandwidth request code for fast uplink allocation as illustrated in Table 2, and may include the same in the UCD message.

The message generator 814 is a block for encoding a MAC message. The message generator 814 generates a transmission message by using the information received from the controller 812. According to an exemplary embodiment of the present invention, the message generator 814 generates a message indicating a resource to be allocated to the mobile station, on the basis of the information received from the controller 812.

The transmitter 816 uses a physical layer encoder to physical-layer-encode the transmission message received from the message generator 814, and transmits the resulting data through an antenna. For example, the transmitter 816 may include a channel coding block, a modulation block, and an RF transmission block.

As described above, according to exemplary embodiments of the present invention, the mobile station requests uplink resource allocation in the broadband wireless communication system by transmitting a periodic ranging code or a bandwidth request code through an initial ranging region. Accordingly, exemplary embodiments of the present invention may limit the bandwidth of an uplink resource, allocated by the base station, by using CDMA codes without defining new CDMA codes, thus making it possible to improve the uplink coverage of the base station and to rapidly allocate an uplink resource. Also, exemplary embodiments of the present invention transmit the periodic ranging code or the bandwidth request code through the initial ranging region to define a new ranging code, thus making it possible to prevent the possibility of a collision between codes.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a mobile station in a wireless communication system, the method comprising:
    transmitting, to a base station, one of second codes through a first region of an uplink subframe based on information indicating first codes corresponding to the first region of the uplink subframe and the second codes corresponding to a second region of the uplink subframe, to request an uplink resource of which a size is smaller than a predetermined size; and
    receiving, from the base station, information for the uplink resource allocated based on the one of the second codes transmitted through the first region,
    wherein the predetermined size is smaller than a maximum size of the uplink resource for transmitting a message.

2. The method of claim 1, further comprising:
    generating a plurality of messages by fragmenting a ranging request message based on a bandwidth of the uplink resource allocated from the base station;
    transmitting, to the base station, one of the plurality of messages with a request for allocating an additional uplink resource to the mobile station; and
    transmitting, to the base station, other of the plurality of messages through the additional uplink resource.

3. The method of claim 1, wherein the transmitting of one of the second codes through the first region comprises:
    detecting at least one code redefined for fast uplink allocation among the second codes; and
    selecting, from the at least one code, a code for requesting a bandwidth corresponding to a size of a transmit message,
    wherein each of the at least one code indicates a size of a requested bandwidth.

4. The method of claim 1, wherein the allocation of the uplink resource is limited based on a ratio of uplink bandwidth to downlink bandwidth of the wireless communication system.

5. The method of claim 1, wherein the allocation of the uplink resource is limited based on one of a scheme of allocating a bandwidth of less than a predetermined size and a scheme of allocating a bandwidth indicated by the one of the second ranging codes.

6. The method of claim 1, wherein the first codes are used in the first region for at least one of initial ranging and handover ranging, and the second codes are used in the second region for at least one of periodic ranging and bandwidth requests.

7. A method for operating a base station in a wireless communication system, the method comprising:
    broadcasting information indicating first codes corresponding to a first region of an uplink subframe and second codes corresponding to a second region of the uplink subframe;
    receiving one of the second codes for requesting an uplink resource of which a size is less than a predetermined size, through the first region of the uplink subframe from a mobile station; and
    transmitting, to the mobile station, information for the uplink resource allocated based on the one of the second codes received in the first region,
    wherein the predetermined size is smaller than a maximum size of the uplink resource for transmitting a message.

8. The method of claim 7, wherein the uplink resource is limited based on one of a scheme of allocating a bandwidth of less than a predetermined size and a scheme of allocating a bandwidth indicated by the received second code.

9. The method of claim 8, further comprising:
    receiving, from the mobile station, one of a plurality of messages with a request for allocating an additional uplink resource to the mobile station, through the uplink resource allocated to the mobile station;

allocating the additional uplink resource to the mobile station; and receiving, from the mobile station, other of the plurality of messages through the additional uplink resource.

10. The method of claim 8,
wherein the broadcasted information includes information about the at least one code for fast uplink allocation among the second codes, and
wherein the one of the second codes received from the mobile station indicates a bandwidth for the uplink resource.

11. The method of claim 7, wherein the limited uplink resource is limited based on a ratio of uplink bandwidth to downlink bandwidth of the wireless communication system.

12. The method of claim 7, wherein the first codes are used in the first region for at least one of initial ranging and handover ranging, and the second codes are used in the second region for at least one of periodic ranging and bandwidth requests.

13. An apparatus of a mobile station for uplink resource allocation in a wireless communication system, the apparatus comprising:
at least one processor operatively coupled to at least one transceiver; and
the at least one transceiver configured to:
transmit, to a base station, one of second codes through a first region of an uplink subframe based on information indicating first codes corresponding to the first region of the uplink subframe and second codes corresponding to a second region of the uplink subframe,
request an uplink resource of which a size is less than a predetermined size, and
receive, from the base station, information for the uplink resource allocated based on the one of the second codes transmitted through the first region,
wherein the predetermined size is smaller than a maximum size of the uplink resource for transmitting a message.

14. The apparatus of claim 13,
wherein the at least one processor is configured to generate a plurality of messages by fragmenting a ranging request message based on a bandwidth of the uplink resource allocated from the base station, and
wherein the at least one transceiver is further configured to:
transmit to the base station, one of a plurality of messages with a request for allocating an additional uplink resource to the mobile station, and
transmit, to the base station, other of the plurality of messages through the additional uplink resource.

15. The apparatus of claim 13,
wherein the at least one processor is configured to:
detect at least one code for fast uplink allocation,
select, from the at least one code, a code for requesting a bandwidth corresponding to a size of a transmit message, and
map the selected code to the first region, and
wherein each of the at least one code indicates a size of a requested bandwidth.

16. The apparatus of claim 13, wherein the allocation of the uplink resource is limited based on a ratio of uplink bandwidth to downlink bandwidth of the wireless communication system.

17. The apparatus of claim 13, wherein the allocation of the uplink resource is limited based on one of a scheme of allocating a bandwidth of less than a predetermined size and a scheme of allocating a bandwidth indicated by the one of the second ranging codes.

18. The apparatus of claim 13, wherein the first codes are used in the first region for at least one of initial ranging and handover ranging, and the second codes are used in the second region for at least one of periodic ranging and bandwidth requests.

19. An apparatus of a base station for uplink resource allocation in a wireless communication system, the apparatus comprising:
at least one processor operatively coupled to at least one transceiver; and
the at least one transceiver configured to:
broadcast information indicating first codes corresponding to a first region of an uplink subframe and second codes corresponding to a second region of the uplink subframe,
receive one of the second codes for requesting an uplink resource of which a size is smaller than a predetermined size, through the first region of the uplink subframe from a mobile station, and
transmit, to the mobile station, information for the uplink resource allocated based on the one of the second codes received in the first region,
wherein the predetermined size is smaller than a maximum size of the uplink resource for transmitting a message.

20. The apparatus of claim 19, wherein the uplink resource is limited based on one of a scheme of allocating a bandwidth of less than a predetermined size and a scheme of allocating a bandwidth indicated by the received second code.

21. The apparatus of claim 20,
wherein the at least one transceiver is further configured to:
receive, from the mobile station, one of a plurality of messages with a request for allocating an additional uplink resource to the mobile station, through the uplink resource allocated to the mobile station, and
receive, from the mobile station, other of the plurality of messages through the additional uplink resource, and
wherein the additional uplink resource is allocated to the mobile station by the base station.

22. The apparatus of claim 20,
wherein the broadcasted information includes information about at least one code for fast uplink allocation among the second codes, and
wherein the one of the second codes received from the mobile station indicates a bandwidth for the uplink resource.

23. The apparatus of claim 19, wherein the limited uplink resource is limited based on a ratio of uplink bandwidth to downlink bandwidth of the wireless communication system.

24. The apparatus of claim 19, wherein the first codes are used in the first region for at least one of initial ranging and handover ranging, and the second codes are used in the second region for at least one of periodic ranging and bandwidth requests.

* * * * *